United States Patent [19]

Mitschele

[11] Patent Number: 4,788,894

[45] Date of Patent: Dec. 6, 1988

[54] HAND TOOL FOR REMOVING SPRINKLER HEADS FROM UNDERGROUND WATERING SYSTEMS

[76] Inventor: Mark A. Mitschele, 4052 E. Shenna Dr., Phoenix, Ariz. 85032

[21] Appl. No.: 40,134

[22] Filed: Apr. 20, 1987

[51] Int. Cl.⁴ ............................................. B25B 27/00
[52] U.S. Cl. ..................................................... 81/488
[58] Field of Search .................. 81/488; 294/50.7; 172/21, 22, 25; 111/4, 99; 47/33

[56] References Cited

U.S. PATENT DOCUMENTS

| | | | |
|---|---|---|---|
| 313,476 | 3/1885 | Cummings | 294/50.7 |
| 2,899,231 | 8/1959 | Steiner | 294/50.7 |
| 3,127,939 | 4/1964 | Rink | 172/25 |
| 3,291,231 | 12/1966 | Kammer | 294/50.7 |

FOREIGN PATENT DOCUMENTS

| | | | |
|---|---|---|---|
| 2267689 | 11/1975 | France | 294/50.7 |
| 510933 | 1/1955 | Italy | 172/22 |
| 137681 | 4/1930 | Switzerland | 294/50.7 |

OTHER PUBLICATIONS

Advertisement–Ames, Parkersburg, West Virginia.

Primary Examiner—Roscoe V. Parker
Attorney, Agent, or Firm—Warren F. B. Lindsley

[57] ABSTRACT

A hand held tool for rotating and twisting as it is forced into the turf and ground over and around a part of a watering system such as a sprinkler head, and employing a ridge at least partially around its inside periphery which traps and compresses the ground in the tool, causing the tool to interlock with the sprinkler head so that the sprinkler head can be threadedly removed from a riser pipe by rotation of the tool.

3 Claims, 2 Drawing Sheets

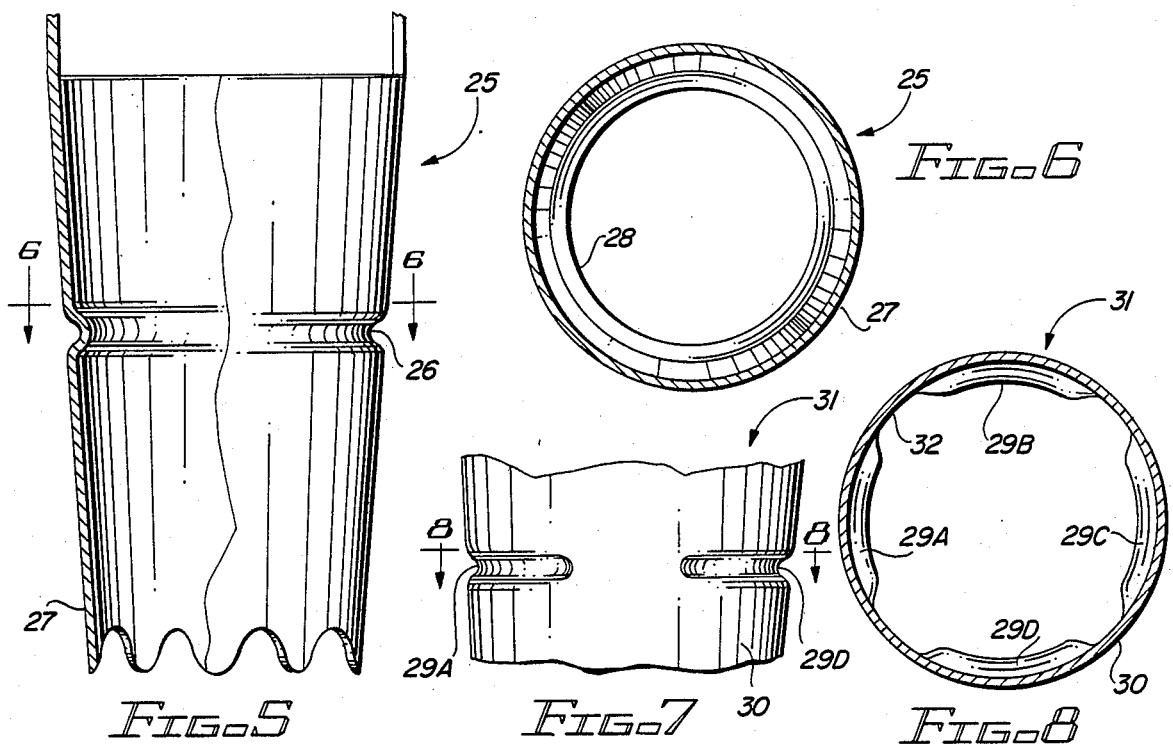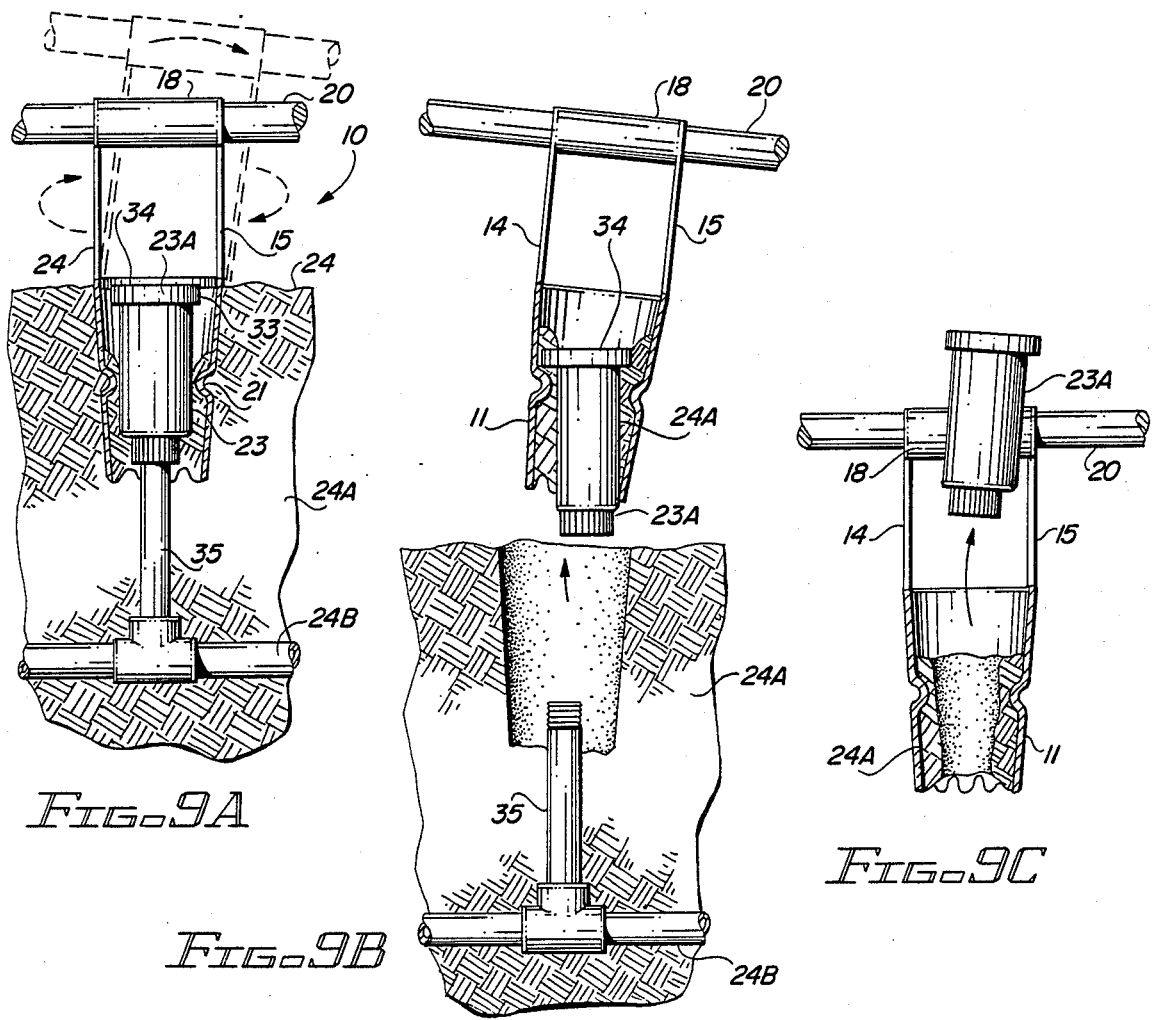

HAND TOOL FOR REMOVING SPRINKLER HEADS FROM UNDERGROUND WATERING SYSTEMS

BACKGROUND OF THE INVENTION

This invention relates to hand tools and more particularly, to hand tools for removing sprinkler heads from underground sprinkling systems.

In the past, sprinkler head removal involved the cutting of the turf encircling the sprinkler head, and the grasping and rotation of the sprinkler head canister to remove it from the associated riser of the underground watering system. Many times, the riser will remain connected to the sprinkler head canister, and separate from the system at a point below the riser pipe.

As the sprinkler head and/or sprinkler head and riser pipe were removed from the underground watering system, loose soil fragments and rocks would fall down around and into the piping system contaminating and plugging the piping system, including other risers and sprinkler heads on the line.

Before repair and/or replacement of the sprinkler head components, the piping system would have to be purged, usually involving at least two servicemen to manipulate the watering system. Such repair was not only time consuming, but required unnecessary cleanup effort.

DESCRIPTION OF THE PRIOR ART

The only known prior art is a hand operated bulb planter advertised and sold by Ames of Parkersburg, W. Va.

SUMMARY OF THE INVENTION

In accordance with the invention disclosed and claimed herein, a new tool is provided which is rotated when hand held to dig into the ground and surround the sprinkler head canister, and in so doing, compress the ground around the canister in the tool causing the tool to firmly grasp the canister so that it may be threadedly disconnected from the associated riser pipe.

It is, therefore, one object of this invention to provide a new hand held tool for removing sprinkler head canisters and/or riser pipes from an associated underground watering system.

Another object of this invention is to provide a new tool which compresses the ground in the tool when it surrounds the sprinkler head canister, causing the tool to tightly grip the canister so that it may be threadedly disengaged and removed from the associated underground watering system without creating loose soil fragments which fall around or in the watering system when the canister is removed from the ground.

A still further object of this invention is to provide a new tool which may be inexpensive to manufacture and sold to the trade.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWINGS

The present invention may be more readily described by reference to the accompanying drawings in which:

FIG. 5 is a partial cross-sectional view of the tool shown in FIG. 1 illustrating the gripping indentation within the tool;

FIG. 6 is a cross-sectional view of FIG. 5 taken along the line 6—6;

FIG. 7 is a partial view of a modification of the tool shown in FIGS. 1-6 wherein the gripping indentation comprises a plurality of circularly aligned spaced sections;

FIG. 8 is a cross-sectional view of FIG. 7 taken along the line 8—8; and

FIGS. 9A-9C diagrammatically illustrate three steps in the removal of a sprinkler head canister from the associated riser pipe of an underground watering system.

DESCRIPTION OF THE PREFERRED EMBODIMENT

Figure 1:
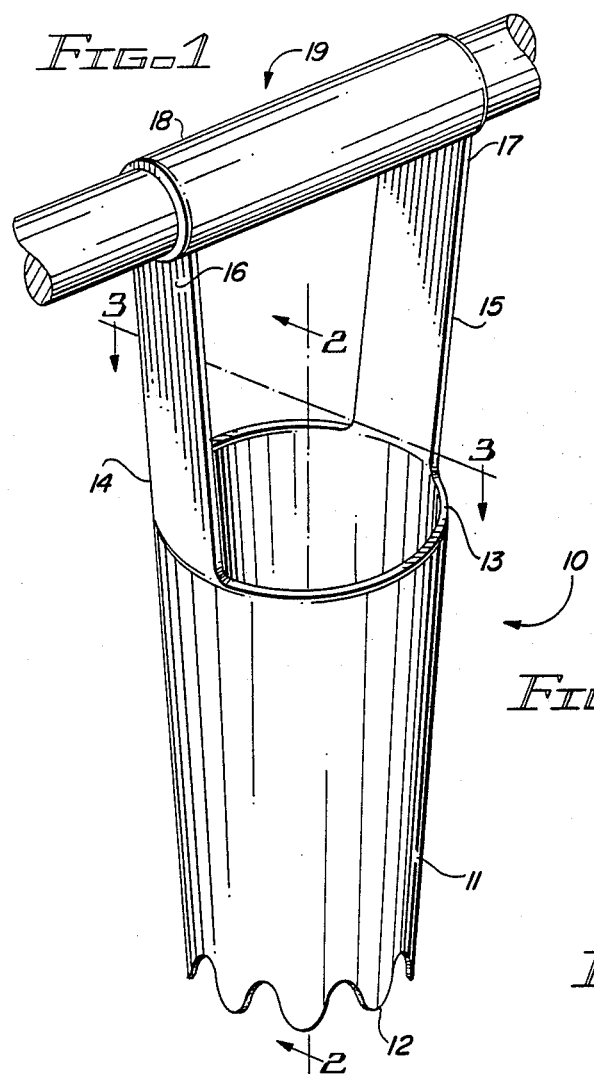
FIG. 1 is a perspective view of a hand held tool for removing sprinkler head and/or riser pipes from associated underground watering systems and embodying the invention.
Figure 2:
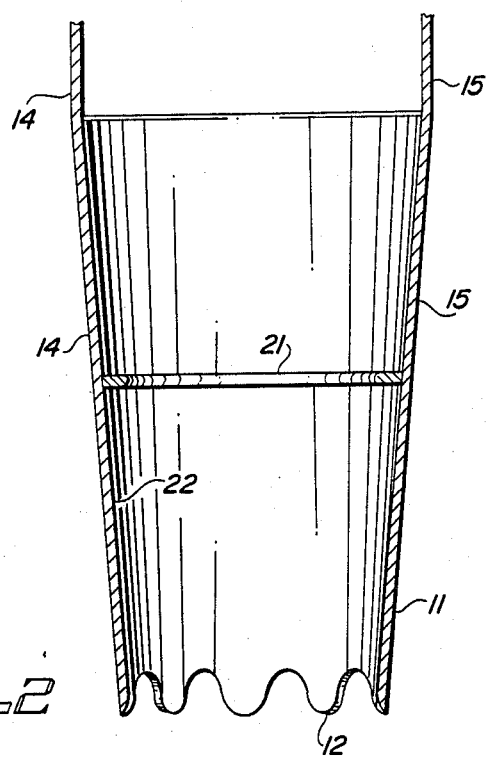
FIG. 2 is a cross-sectional view of FIG. 1 taken along the line 2—2.
Figure 3:
FIG. 3 is a cross-sectional view of FIG. 1 taken along the line 3—3.

Referring more particularly to the drawings by characters of reference, FIGS. 1-3 disclose a tool 10 for removing sprinkler heads and/or riser pipes from an underground watering system comprising a hollow tapered coneshaped shell or housing 11 of approximately four to six inches long and having approximately a three inch diameter at its wide end and a two and one-quarter inch diameter at its narrow end. The narrow end is serrated along its edge and is provided at its other end 13 with outwardly extending flanges 14 and 15 that are interconnected at their free ends 16 and 17 by a hollow interconnecting cylinder 18 forming a handle 19. Cylinder 18 is provided for receiving axially therein a short rod 20 which serves as an extension of handle 19.

At a point substantially midway of its length, housing 11 is provided with a ring or flange 21 which is mounted to extend radially inwardly of the inside periphery 22 of housing 11 a short predetermined distance, such as ¼ to ⅝ of an inch.

Figure 4:
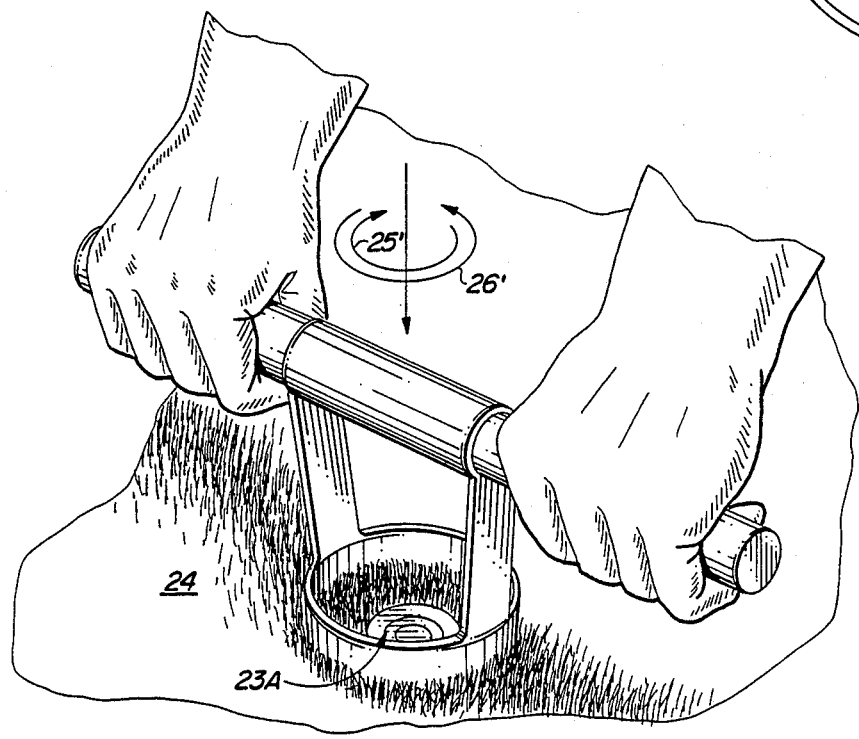
FIG. 4 is a partial perspective view of the tool shown in FIG. 1 illustrating how it may be forced into the ground around a sprinkler head canister.

As shown in FIG. 4, tool 10 is placed around a canister 23 of a sprinkler head 23A with its serrated end 12 extending into turf 24 of ground 24A. Sprinkler head 23A is part of an associated sprinkling system 24B. The tool is then rotated and twisted in both directions, as shown by arrows 25' and 26', around sprinkler head 23 as it is being pressed into the turf and ground causing the tool to cut through turf 24 and the ground underneath it so as to surround the sprinkler head.

FIGS. 5 and 6 illustrate a modification of the hand tool showing in FIGS. 1-4 having the same features as tool 10, except in tool 25, ring 21 of tool 10 is replaced by an indentation 26 formed in and around its housing 27. This indentation forms a ridge 28 inside of housing 27 which functions in the same manner as ring 21 of tool 10.

FIGS. 7 and 8 disclose a still further modification of tools 10 and 25 wherein a plurality of spaced indentations 29A-29D are formed in the outer surface of housing 30 of tool 31 to form a plurality of ridge sections extending inwardly of the periphery of the inside surface 32 of housing 30 to function in the same manner as ring 21 of tool 10. Although the ridge sections are shown in a circular arrangement, they may be axially spaced from each other along the length of the tool and still fall within the scope of this invention.

FIGS. 9A-9C disclose the steps in using the tools, such as tool 10, which is first pressed and rotated into and through the turf and ground around a faulty sprinkler head 23 until it substantially reaches the place around the sprinkler head shown in FIGS. 9A. It should be noted that rod 20 may be removed from cylinder 18 so that the tool can be easily rotated by one hand of the user in poor clearance areas, such as against walls. Dowel pin or rod 20 can be inserted into the handle formed by cylinder 18 for two-handed operation, one on each side of cylinder 18 for application of more pressure on the tool when encountering rocky or hardpan soils.

The serrated end 12 of tool 10 readily cuts through the turf and ground beneath it as it is rotated and twisted and pushed into the soil around the complete sprinkler head, until the top or cap of the sprinkler head is substantially flush with the opening at end 13 of the tool.

As the tool moves down through the soil around the sprinkler head, the cone-shaped opening inside housing 11 of tool 10, as well as the ridges formed inside of tools 25 and 31, aid in containing and compressing the soil inside of the tool around the sprinkler head and, particularly under ring 21 and against sprinkler head 23. As soil is forced between the tool's lower opening and the sprinkler head, it will continue upward until the restricted clearance of the ring will prevent most of it from traveling further upwardly into the tool.

At the same time, soil at the junction of the riser pipe 35 and the canister 23 of the sprinkler head 23A is compressed downwardly due to the inner ring 21, i.e., the initial purpose of the ring. Because of the compression of the soil in the riser pipe area, the riser will remain secured to the sprinkling system below, thereby enabling separation at the junction of the riser pipe 35 and canister 23 of the sprinkler head, rather than any coupling of the sprinkling system further below the sprinkler head. This is one of the major benefits of the tool to obtain a clean separation at the required junction.

Further, any soil that squeezed through ring 21 on downward compression of tool 10 comes into contact with the underside 33 of cap 34 of the sprinkler head which is slightly larger in diameter than canister 23 of sprinkler head 23A.

Still further, upon insertion of tool 10 into the ground, more of the wet compressed soil in housing 11 will flow to one side of the tool, thereby tilling tool to one side of the sprinkler head, as shown in FIGS. 9A and 9B.

It should be noted, that the usual condition of an irrigated lawn area is that the soil is moist or wet. This results in the soil being cohesive and aids in its compaction during tool use.

The unavoidable tilting of the tool upon insertion may be attributed to the soil conditions between the tool and the sprinkler head following the path of least resistance along with the operator being unable to maneuver the tool exactly parallel with the axis of the sprinkler head.

The operator then applies pressure to handle 19 in the direction of tilt and then pulls the tool up slightly while still applying pressure in the direction of the till, as shown by the dash lines in FIG. 9A. This will compress the soil between the underside of cap 33 and the top of ring 21 on one side of the tool. The continued pressure and upward pull will be applied through the unthreading procedure of the sprinkler head.

This is the upward locking motion by the operator that will apply torque from the tool's body 11 and ring 21 through the compressed soil to the sprinkler head and its cap 34, enabling the tool to grip the sprinkler head firmly in the tool and prevent further upward movement of the tool out of the ground until the sprinkler head is unthreaded.

The tool handle 19 is now turned counterclockwise to remove the sprinkler head 23A from its threaded connection with the top end of riser pipe 35. The tool containing the sprinkler head is then removed from the hole in the ground.

Because the soil is compressed below the opening in the top of the riser pipe 35, the soil outside of the tool has been compressed and the layer of soil and sod around the sprinkler head being contained in the tool, there is very little chance of soil fragments or rocks falling into the associated riser pipe opening.

With the sprinkler head removed in this manner by tool 10, an open work area in the hole is provided enabling visual inspection of the riser pipe and most important, exposure of the threads on the top of the riser pipe, thereby assuring easy access thereto for replacement of a repaired or replacement sprinkler head.

Upon removal of the tool and sprinkler head from the ground, the head is pushed by operator's fingers from the narrow end 12 of the tool up through the soil layer in the tool and taken out of its upper larger open end 13, as shown in FIG. 9C.

The layer of soil and sod remaining in the tool, as shown in FIG. 9C, can be peeled out with the operator's fingers and pressed around the repaired or replacement sprinkler head in the hole to secure it firmly back in the lawn area. With the use of this tool, there is very little evidence of a sprinkler repair having been made.

The tool disclosed may be made in various sizes to fit and remove various sprinkler heads.

A further use of the tool disclosed is to remove only the turf and sod around the sprinkler head by twisting and cutting into the material with the serrated end of the tool without penetrating deeper into the ground around the sprinkler head.

After cutting a doughnut-shaped piece of sod around the head, the grass ring can be removed by prying with the fingers of the operator. This action will enable the sprinkler head to be inspected or any grass restriction removed for better spray coverage.

Although but a few embodiments of the invention have been illustrated and described, it will be apparent to those skilled in the art that various changes and modifications may be made therein without departing from the spirit of the invention or from the scope of the appended claims.

What is claimed is:

1. A hand held tool for penetrating the turf and ground over and around a sprinkler head of an underground watering system for removing and repair or replacement of said sprinkler head comprising:

a hollow conical-shaped member, the narrow end of which is serrated around the edge of its periphery for penetrating the turf and ground, and the wider end of which is provided with a handle means extending axially therefrom, and means forming a ridge extending inwardly of and fully around the inside periphery of said member at a point substantially midway of its length for aiding in compressing and trapping the ground inside of said member for holding firmly said sprinkler head within said member when the tool is rotated to remove said sprinkler head from the watering system.

2. The hand held tool set forth in claim 1 wherein: said ridge is formed by an indentation extending inwardly of the outside periphery of said member.

3. The hand held tool set forth in claim 1 wherein: said means comprises a dual purpose ring secured to the inside periphery of said member.

* * * * *